US008112244B2

(12) United States Patent
Schmidt et al.

(10) Patent No.: US 8,112,244 B2
(45) Date of Patent: *Feb. 7, 2012

(54) SENSOR FOR THE DETECTION OF THE POSITION OF A MECHANICAL FORCE-TRANSMITTING DEVICE

(75) Inventors: Frank Schmidt, Zorneding (DE); Oliver Sczesny, Aschheim (DE); Andreas Schneider, Munich (DE)

(73) Assignee: Enocean GmbH, Oberhaching (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/758,183

(22) Filed: Apr. 12, 2010

(65) Prior Publication Data

US 2010/0198551 A1 Aug. 5, 2010

Related U.S. Application Data

(63) Continuation of application No. 11/296,443, filed on Dec. 6, 2005, now Pat. No. 7,698,093, which is a continuation of application No. PCT/DE2004/001076, filed on May 24, 2004.

(30) Foreign Application Priority Data

Jun. 6, 2003 (DE) .................................. 103 25 800

(51) Int. Cl.
*G01C 19/00* (2006.01)
(52) U.S. Cl. ...................................................... 702/150
(58) Field of Classification Search .................... 702/150
See application file for complete search history.

(56) References Cited

U.S. PATENT DOCUMENTS

| 4,125,767 A | 11/1978 | Silver ......................... 250/214 D |
| 7,698,093 B2* | 4/2010 | Schmidt et al. ................ 702/150 |
| 2004/0032748 A1* | 2/2004 | Trudeau et al. ................ 362/554 |
| 2005/0002277 A1 | 1/2005 | Fukuda et al. .................. 368/80 |
| 2005/0030177 A1 | 2/2005 | Albsmeier et al. ........ 340/539.26 |
| 2005/0199282 A1 | 9/2005 | Oleinick et al. .............. 136/256 |
| 2005/0275581 A1 | 12/2005 | Grassl et al. ................... 341/173 |

FOREIGN PATENT DOCUMENTS

| DE | 296 18 351 U | 12/1996 |
| DE | 199 46 917 | 4/2001 |
| DE | 199 46 919 A | 4/2001 |
| DE | 201 10 780 U | 9/2001 |
| DE | 100 59 582 A | 6/2002 |
| EP | 1 271 439 | 1/2003 |

(Continued)

OTHER PUBLICATIONS

English translation of WO 03/034366 (Abstract, Description, Claims), Apr. 24, 2003.*

(Continued)

*Primary Examiner* — Michael Nghiem
(74) *Attorney, Agent, or Firm* — Foley & Lardner LLP; Matthew L. Fenselau

(57) ABSTRACT

A device for the wire-free determination of a position of a mechanical force-transmitting device, having at least one storage device for storing electrical energy, at least one sensor element which detects the position and is monitored by at least one sensor electronic unit, including at least one radio transmitter, and at least one photovoltaic energy supply device supplying the storage device with electrical energy.

14 Claims, 1 Drawing Sheet

FOREIGN PATENT DOCUMENTS

| | | |
|---|---|---|
| JP | 08-246719 | 9/1996 |
| JP | 2007-137361 | 6/2007 |

OTHER PUBLICATIONS

English translation of EP 1 271 439 (Abstract, Description, Claims), Jan. 3, 2003.*
"Embedded", TheFreeDictionary, printed on Mar. 23, 2011.*
Communication from EPO dated Jun. 15, 2007 issued for the corresponding European Application No. 04 738 545.5-2213.
English Abstract of JP 08-246719, Sep. 1996.
English Abstract of JP 2007-137361, Jun. 2007.
English Translation of WO 2003/034366, Apr. 24, 2003.
English Abstract of DE 296 18 351, Dec. 19, 1996.
Engish Translation of DE 100 59 582, Jun. 13, 2002.
English Translation of DE 199 46 919, Apr. 5, 2001.
English Translation of EP 1 271 439, Jan. 3, 2003.

* cited by examiner

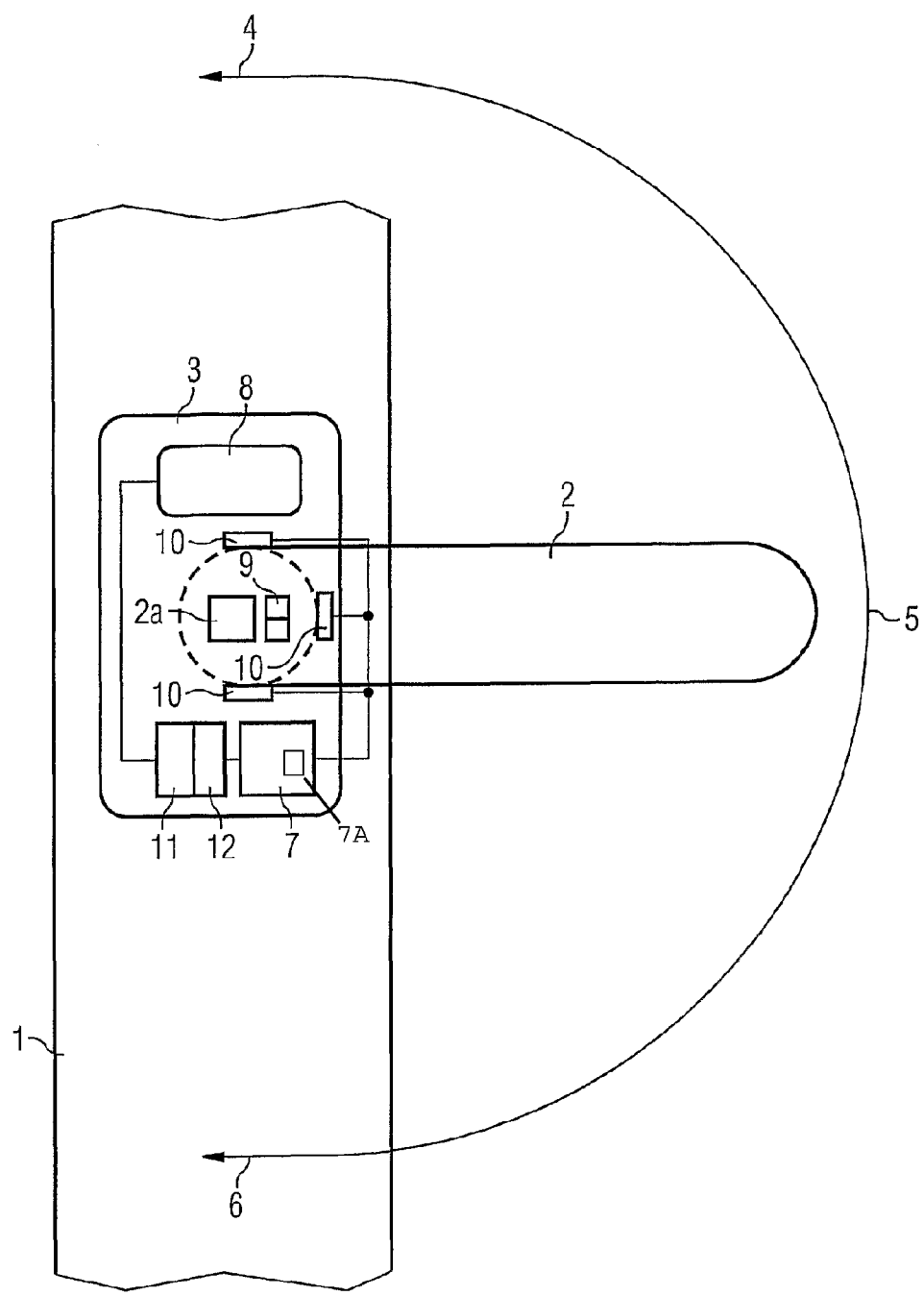

SENSOR FOR THE DETECTION OF THE POSITION OF A MECHANICAL FORCE-TRANSMITTING DEVICE

RELATED APPLICATIONS

This is a continuation of U.S. patent application Ser. No. 11/296,443, filed Dec. 6, 2005 and now granted as U.S. Pat. No. 7,698,093, which is a continuation of International Application No. PCT/DE2004/001076, filed on May 24, 2004, which claims priority from German Application No. 103 25 800.0 filed Jun. 6, 20003, the contents of which are hereby incorporated by reference.

FIELD OF THE INVENTION

The invention relates to a sensor for the detection of the position of a mechanical force-transmitting device.

BACKGROUND OF THE INVENTION

Sensors for the detection of the position of a mechanical force-transmitting device are used, for example, in the case of windows regarding whose locking state a signal is to be communicated, for example to an alarm system or a system for building automation. This relates for example to the precondition for the arming of alarm systems which requires that all windows and doors must be in a closed and locked state. A further example is the use of the locking state of a window for regulating space heating systems which, with windows that are unlocked or open, for example end or at least restrict the supply of further heating energy for this space. Furthermore, a multiplicity of other exemplary applications are conceivable in which a detection and/or determination of the position of mechanical force-transmitting devices is advantageous.

Sensors suitable for the areas of application mentioned above are often provided with electronic circuits that communicate information to a remote evaluation device by means of a radio signal. This reduces the installation outlay by virtue of saving electrical leads for supplying the "radio sensors" with electrical energy. What is disadvantageous about this is the rising maintenance outlay therewith, since the supply with electrical energy that is realized by batteries has to be renewed at regular time intervals. A further disadvantage is the problem area of retrofitting with such "radio sensors". The latter, due to the use of batteries as energy supply, usually cannot subsequently be fitted in concealed fashion. One example thereof is sensors of the abovementioned type in the case of window frames, or window levers.

SUMMARY OF THE INVENTION

One object of the invention is to provide a device of the above-mentioned type which, in comparison with the known devices, without increasing the installation outlay or the maintenance outlay, can also subsequently be fitted in concealed fashion.

This and other objects are attained in accordance with one aspect of the invention by a device for the wire-free determination of a position of a mechanical force-transmitting device, having at least one storage device for storing electrical energy, at least one sensor element which detects the position of the mechanical force-transmitting device and is monitored by at least one sensor electronic unit, comprising at least one radio transmitter, wherein the at least one photovoltaic energy supply device supplies the storage device with electrical energy.

In this case, the photovoltaic energy supply device, for example a solar cell, advantageously enables spatially substantially smaller storage devices, since the storage device is always charged by the solar cell, given the presence of enough light. The capacity of the storage device can accordingly be chosen to be smaller and the structural size is thus significantly reduced.

The smaller structural size of the storage device, for its part, comprises the advantage of the device being able to be retrofitted into the faceplate arranged around window handles, for example.

One advantageous embodiment of the invention provides a timer circuit, which activates the sensor electronic unit at predetermined time intervals. The energy-consuming components of the device are thus deactivated at times. This leads to a lower energy demand compared with an uninterrupted mode of operation. In a further embodiment, the timing or the time interval of the activation can advantageously be set, so that an approximately permanent transmission of the sensor information can be produced. This is indispensable for various applications, since continuous information about the position of a lever is required. This further energy saving brings about an even smaller structural form of the storage device, so that the whole device is smaller and can thus more easily be subsequently mounted in concealed fashion.

If the concealed mounting location for the device is a faceplate of a window handle, for example, then the solar cell can be fitted there within the faceplate, it being necessary to provide a connection to the storage device. It is advantageous, therefore, to integrate the solar cell into the faceplate in such a way that this cannot inadvertently be removed or destroyed from outside.

Various principles are suitable as storage devices. The principle to which the storage device corresponds is of secondary importance for the function of the device. Of greater priority is the size of the storage device, which should be small enough in order that a concealed mounting of the device is feasible in faceplates or other cavities, not described in greater detail, in the immediate vicinity of a mechanical force-transmitting device such as, for example a lever, for example a window lever.

Furthermore, the capacity of the storage device is to be chosen such that enough energy is available during dark phases during which the solar cell does not supply any energy. Thus, storage devices such as, for example electrical capacitors as well as electrochemical accumulators are suitable.

The position of the mechanical force-transmitting device is detected by means of a magnetosensitive sensor, or a magnetic field detector. What is advantageous about this embodiment is the simple capability for retrofitting, since one or more small magnets can be fitted to a mechanical force-transmitting device, for example a shaft of the lever, in a simple manner. The magnetic field detector is advantageously arranged at the end positions of the mechanical force-transmitting device, for example of the lever at the corresponding points. If a magnet lies opposite a magnetic field detector, then the latter responds, and communicates this information to the sensor electronic unit. The sensor electronic unit communicates this information to a remote evaluation device by means of a radio signal. Said evaluation device is not part of the invention and for this reason is not described any further here.

BRIEF DESCRIPTION OF THE SINGLE DRAWING

The FIGURE shows a frame detail from a window frame with a mechanical force-transmitting device, for example a lever, connected to a shaft, which is equipped with a device according to the abovementioned principle.

DETAILED DESCRIPTION OF THE SINGLE DRAWING

The window frame 1 which is indicated symbolically here by means of a detail, contains a lever 2, which transmits the movement of the lever 2 to a locking mechanism by means of a shaft 2a engaging in the locking mechanism. Accordingly, the position of the window lever is an indication of the position of the locking mechanism.

Components of the device described here are arranged below a faceplate 3 arranged around the shaft 2a of the window lever 2. The compact and small design of the individual components enables the arrangement within the abovementioned faceplate. With the arrangement in the faceplate it is possible to realize a simple and at the same time concealed mounting arrangement.

A solar cell 8 is arranged in the upper section of the faceplate 3 (as it is shown in the drawing), the faceplate 3 being provided with a cutout through which light can impinge on the solar cell 8. As an alternative, said cutout can also be filled with a transparent layer in order to protect the solar cell 8 from mechanical damage.

The solar cell 8 is connected to a storage device 11, illustrated in the lower section of the faceplate 3. Said storage device stores the electrical energy supplied by the solar cell 8. By way of example, either electrochemical accumulators or electrical capacitors are suitable as the storage device.

The storage device 11, for its part, is connected to a timer circuit 12, which at predetermined time intervals supplies the sensor electronic unit 7—which is likewise connected to it—with electrical energy. In this case, the sensor electronic unit 7 contains a radio transmitter 7A that emits a radio signal. The time intervals in which the timer circuit 12 supplies the sensor electronic unit 7 with electrical energy can be set, with the result that it is possible to set an optimized operating point of the whole device. Various parameters are to be taken into consideration for assessing an optimum operating point of the whole device:
the quantity of available light,
the size of the available mounting location,
the frequency of the transmission events to a remote evaluation device, etc.

The sensor electronic unit 7, for its part, is in turn connected to sensors 10. Magnetic field detectors or magnet-actuated reed contacts are suitable as the sensors 10. The sensors 10 are arranged around a shaft 2a and switch if a permanent magnet 9 arranged at the shaft 2a is situated opposite them. The position of the lever can thus be determined through the rotation of the shaft 2a in the case of an actuation of the lever 2a.

Upon actuation of the window lever 2, a switching operation is effected at one of the sensors 10, as a result of which the sensor electronic unit 7 can be activated as an alternative to the timer circuit 12. The sensor electronic unit 7 transmits the position of the window lever 2 together with an identification number of the device by radio to the remote evaluation device.

Furthermore, the timer circuit 12 is embodied in highly power-saving fashion. At fixed or variable time intervals, the timer circuit 12 automatically likewise activates the transmission of the position of the window lever 2 and also the identification number of the device through the activation of the sensor electronic unit 7. Continuous window lever monitoring can be realized in this way.

In a remote reception and evaluation unit (not illustrated), the radio signals of all devices situated in the detection region are received and evaluated in accordance with the principle mentioned above. A further action can thus be initiated, for example at a heating regulating system, an alarm for informing the occupant by means of a display, feeding the information into a building automation system.

In order to avoid incorrect signals or to avoid radio interference, the following redundancy measures are taken in the radio transmission and the evaluation of the radio signals:
multiple transmission of the information during each communication with fixed pauses and also pauses that are variable (e.g. randomly controlled),
momentary increase in the transmission activity in the event of a change in state of the window lever 2,
ascertainment of system-disturbance plausibility by waiting for a plurality of signals in the case where the automatically transmitted status messages fail to appear.

The exemplary embodiment illustrated above relates to a window lever at a window frame. However, a device according to the invention is not only suitable for window levers at window frames but is also suitable for numerous other mechanical levers. All applications which require an automated determination of lever positions, where this is to be transmitted to a remote evaluation device, and where it is desired to effect the mounting in the minimum of space possibly subsequently, where the mounting is also intended to be effected in concealed form.

The scope of protection of the invention is not limited to the examples given hereinabove. The invention is embodied in each novel characteristic and each combination of characteristics, which includes every combination of any features which are stated in the claims, even if this combination of features is not explicitly stated in the claims.

We claim:

1. A detector device for wireless determination of a position of a mechanical force-transmitting device, comprising:
at least one storage device for storing electrical energy;
at least one sensor element configured to detect the position of the mechanical force-transmitting device;
at least one sensor electronic unit configured to monitor the at least one sensor element, the at least one sensor electronic unit comprising at least one radio transmitter; and
at least one photovoltaic energy supply device configured to supply the at least one storage device with electrical energy,
wherein the detector device is embedded in a mount in a frame of a window, the mount located in an immediate vicinity of the mechanical force-transmitting device;
wherein at least one timer circuit is coupled to the storage device and is configured to activate the sensor electronic unit at one of the predetermined time interval and predeterminable time intervals;
wherein the at least one photovoltaic energy supply device is embedded in a faceplate; said faceplate arranged around the mechanical force-transmitting device.

2. The device as claimed in claim 1,
wherein the detector device is embedded in the frame in a concealed fashion.

3. The device as claimed in claim 2,
wherein the mechanical force-transmitting device is a window handle arranged on the window frame.

4. The device as claimed in claim 1,
wherein the mechanical force-transmitting device is a window handle arranged on the frame.

5. The device as claimed in claim 1,
wherein the sensor element is a magnetic field detector.

6. The device of claim 5,
wherein the magnetic field detector is a magnet-actuated reed contact.

7. The device as claimed in claim 6,
wherein the sensor element is arranged at an end position of the mechanical force-transmitting device.

8. The device as claimed in claim 6,
wherein an actuation of the sensor element activates the sensor electronic unit.

9. The device as claimed in claim 6,
wherein the at least one timer circuit is coupled to the storage device and is configured to activate the sensor electronic unit at one of the predetermined time interval and predeterminable time intervals.

10. The device as claimed in claim 5,
wherein the sensor element is arranged at an end position of the mechanical force-transmitting device.

11. The device as claimed in claim 1,
wherein the sensor element is arranged at an end position of the mechanical force-transmitting device.

12. The device as claimed in claim 1,
wherein an actuation of the sensor element activates the sensor electronic unit.

13. The device as claimed in claim 1,
where in the storage device is at least one of an electrical capacitor and an electrochemical accumulator.

14. The device as claimed in claim 1,
wherein the storage device is at least one of an electrical capacitor and electrochemical accumulator.

* * * * *